United States Patent [19]

Aono

[11] Patent Number: 4,531,399
[45] Date of Patent: Jul. 30, 1985

[54] METHOD OF CALIBRATING PRESSURE SENSOR

[75] Inventor: Shigeo Aono, Tokyo, Japan

[73] Assignee: Nissan Motor Co., Ltd., Yokohama, Japan

[21] Appl. No.: 573,761

[22] Filed: Jan. 25, 1984

[30] Foreign Application Priority Data

Jan. 26, 1983 [JP] Japan ................................. 58-9930

[51] Int. Cl.³ .......................................... G01M 15/00
[52] U.S. Cl. ........................................ 73/4 R; 73/115
[58] Field of Search ...................... 73/116, 115, 117.3, 73/4 R; 364/551

[56] References Cited

U.S. PATENT DOCUMENTS 4,403,505  9/1983  Hattori et al. ................... 73/115 X

FOREIGN PATENT DOCUMENTS 452925  5/1968  Switzerland ......................... 73/115

Primary Examiner—Jerry W. Myracle
Attorney, Agent, or Firm—Schwartz, Jeffery, Schwaab, Mack, Blumenthal & Evans

[57] ABSTRACT

The present invention features a method of calibrating a pressure sensor disposed in an internal combustion engine which is characterized by delaying the ignition until combustion pressure is not generated during the compression stroke, recording the pressure history and mathematically deriving the essentially symmetrical half of the motoring pressure wave which occurs within the combustion chamber during the expansion stroke thereby obtaining the total motoring pressure history irrespective of the generation of combustion pressure. This data permits the output of the pressure sensor to be frequently compared with predetermined motoring pressure values for the same amount of inducted air and thus the value assigned to the output of the sensor to be adjusted to allow for the physical changes which occur within the sensor with temperature and age.

8 Claims, 30 Drawing Figures

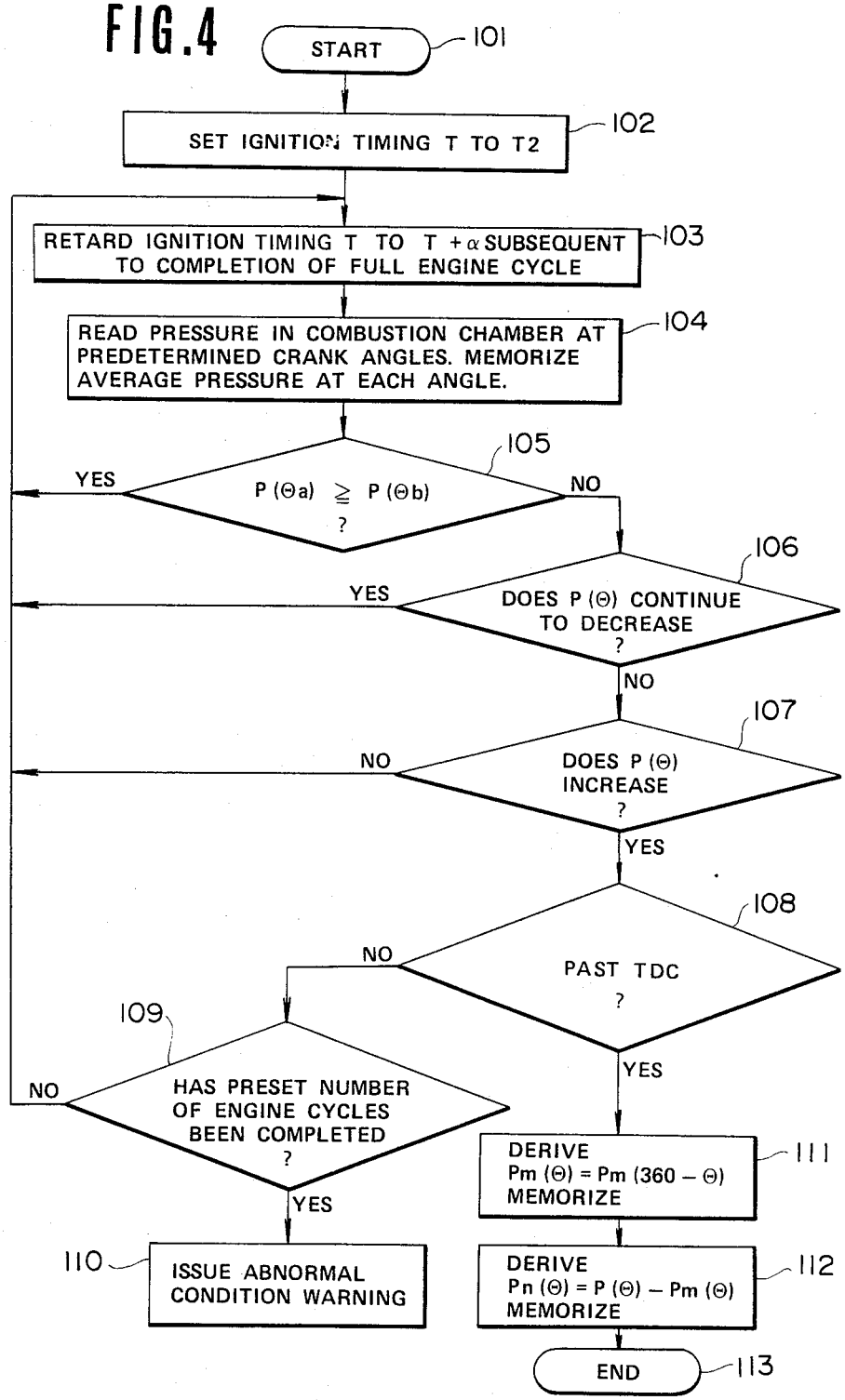

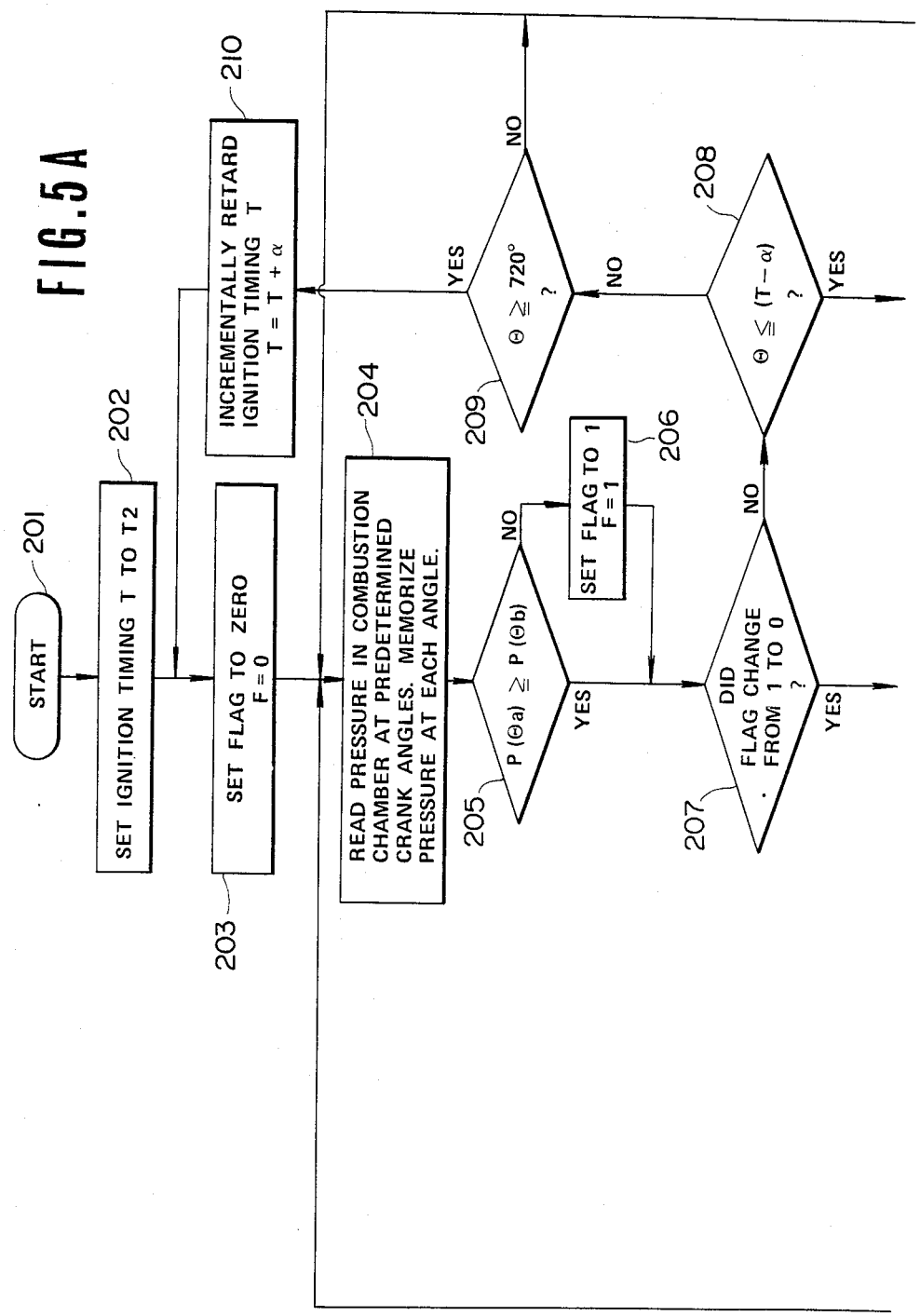

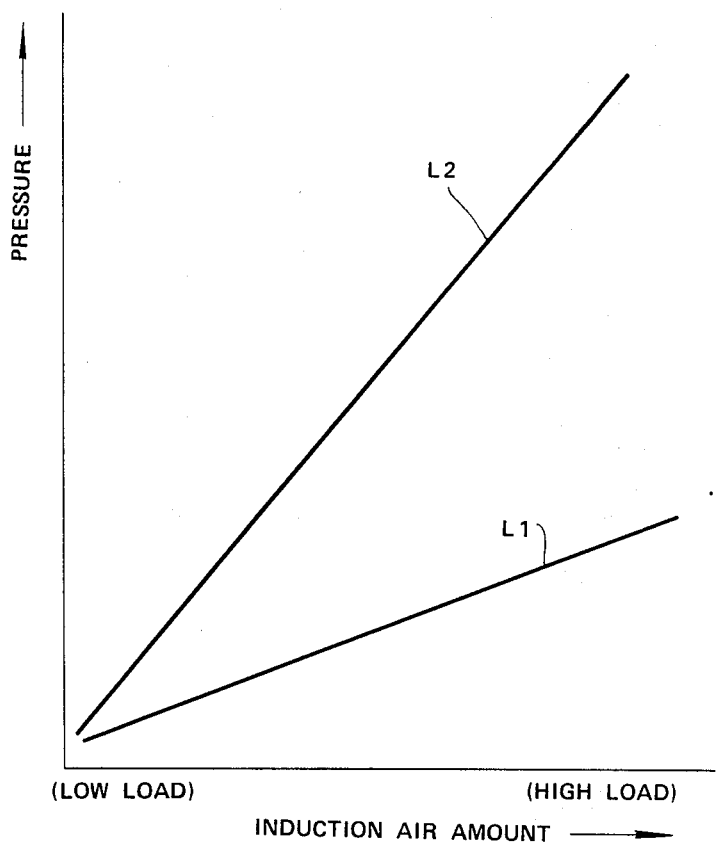

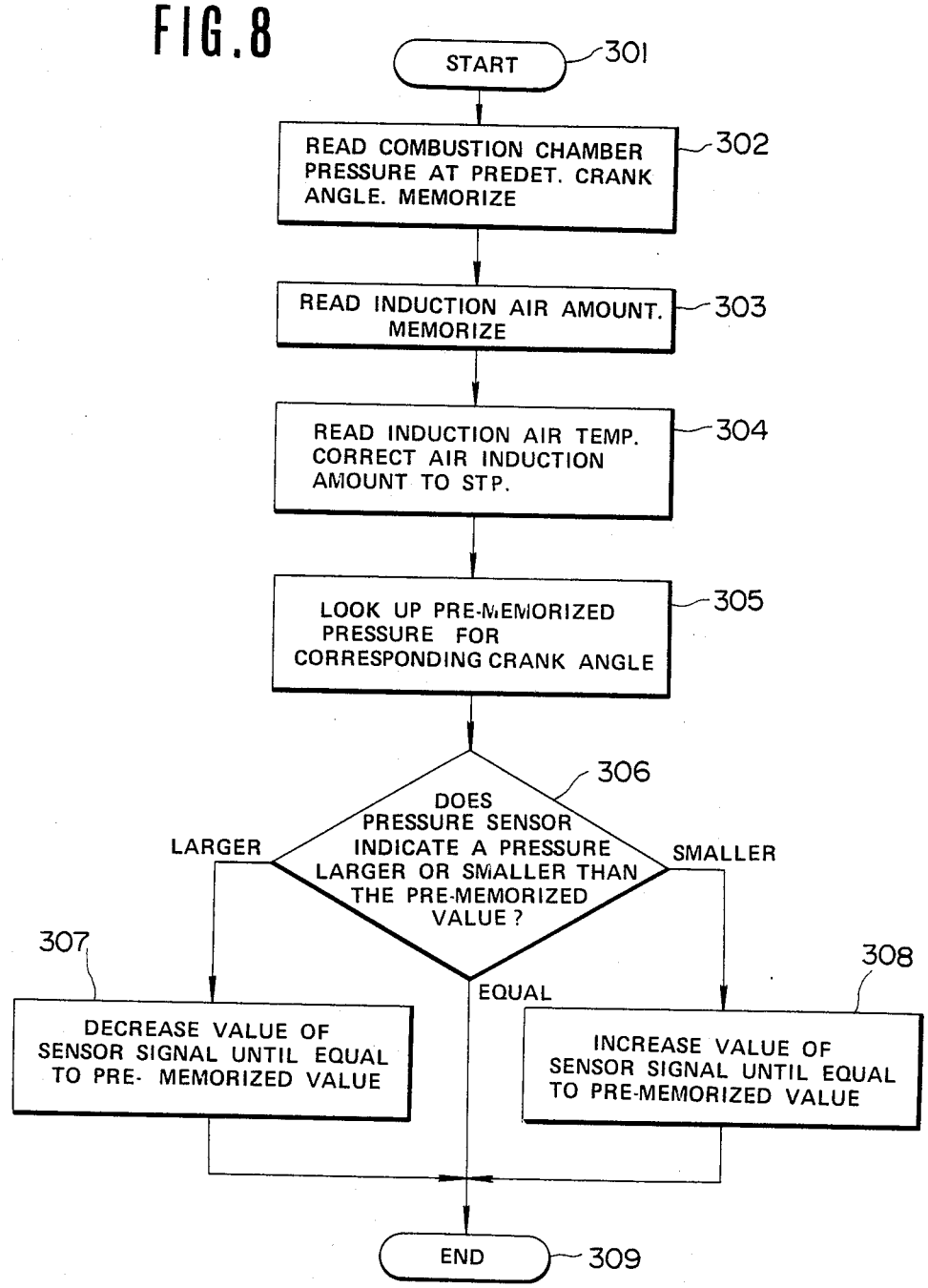

FIG.10

| PARAMETER | EGR | A/F | IGN. TIMING |
|---|---|---|---|
| A — MAX. COMBUST PRESSURE | LARGE | LARGE | LARGE |
| B — CRANK ANGLE AT WHICH MAXIMUM COMBUST PRESS. OCCURS | LARGE | SMALL | LARGE |
| C — RATE OF PRESS INCREASE/DECREASE | LARGE | LARGE | SMALL |
| D — AMOUNT OF HEAT GEN. | LARGE | LARGE | SMALL |
| E — COMBUSTION TIME | LARGE | LARGE | SMALL |

METHOD OF CALIBRATING PRESSURE SENSOR

BACKGROUND OF THE INVENTION

1. Field of the Invention

The present invention relates generally to an internal combustion engine and more specifically to a method of calibrating a pressure sensor used therein.

2. Description of the Prior Art

Various attempts have been made to control the combustion process occuring within a combustion chamber of an internal combustion engine via sensing the pressure produced therein and effecting various measures in response thereto. One example of such is found in Japanese Provisional Patent Publication No. Sho 49-17973 wherein an ionization current is produced in accordance with combustion chamber pressure and the ignition timing of the of the engine varied to produce the maximum possible pressure. Another example is found in Japanese Provisional Patent Publication No. Sho 49-29209 wherein both the pressure in the combustion chamber and the crankangle are simultaneously sensed and the angle at which the maximum pressure occurs compared with a standard angle for the purposes of determining an optimal angle at which to effect ignition.

Further examples are found in:

Japanese Provisional Patent Publication No. Sho 53-56429 in which the disclosed arrangement seeks to control the ignition timing so that the peak pressure in the combustion chamber does not exceed a level whereat noxious (exhaust gas) components are generated in undesirable quantities.

Japanese Provisional Patent Publication No. Sho 57-77935 discloses an arrangement wherein the difference between the sensed maximum combustion chamber pressure and a standard are compared to control the maximum pressure in accordance with a predetermined standard or schedule.

Japanese Provisional Patent Publication No. Sho 52-151432 in which the disclosed arrangement utilizes the fact that ratio of the maximum pressure (Pmax) and a motoring pressure (Pm) increases with ignition timing advance to a maximum value which is essentially equal to the MBT (minimum spark advance for best torque) and whichis essentially independent of operational parameters such as engine speed, induction vacuum, air-fuel ratio and the like. This system is meritorious in that it is uncessary to effect compensations for changes in atmospheric conditions (e.g. atmos. pressure), engine characteristics and the like as compared with systems wherein generally average ignition timings are programmed in accordance with test results.

Japanese Provisional Patent Publication No. Sho 53-60431 teaches a system wherein ignition timing is advanced until knocking occurs and wherein the maximum combustion chamber pressure: motoring pressure ratio is controlled to a predetermined value in a manner similar to that disclosed in connection with Japanese Provisional Patent Publication No. Sho 52-151432.

Japanese Provisional Patent Publication No. Sho 52-39038 teaches an arrangement wherein control is effected to operated the engine at a minimum fuel consumption rate by varying the spark timing, sensing the torque variation and discrimiating between the phases of torque and ignition phase variations and controlling the ignition timing in response thereto.

However, a problem common to all of the above previously proposed arrangements comes in that the effect of the motoring pressure (viz., the pressure produced by only the movement of the piston) is not discriminated from the pressure actually produced by the combustion of the air-fuel mixture. Accordingly, it is impossible to distinguish whether the pressure produced by combustion has decreased (for example) or the combustion process per se changed. Accordingly, it has been impossible until this time to accurately determine the nature of the combustion process and therefore impossible to appropriately control the ignition timing and/or other operational parameters such as air-fuel ratio and the like to an optimal level.

SUMMARY OF THE INVENTION

It is an object of the present invention to provide a method via which a pressure sensor utilized in an internal combustion engine, for example, may be calibrated so as to take into acount the physical changes which occur therein with change of temperature and the passing of time.

In brief, this object is fullfilled via delaying the ignition of the engine until combustion pressure is not generated during the compression stroke, recording the pressure history and mathematically deriving the essentially symmetrical half of the motoring pressure wave which occurs within the combustion chamber during the expansion stroke thereby obtaining the total motoring pressure history irrespective of the generation of combustion pressure. The data permits the output of the pressure sensor to be frequently compared with predetermined motoring pressure values for the same amount of inducted air and thus the value assigned to the output of the sensor to be adjusted to allow for the physical changes which occur within the sensor with temperature and age.

More specifically, the present invention takes the form of a method for use in an internal combustion engine having a piston operatively connected with a crankshaft and movably disposed in a cylinder to define a combustion chamber and a sensor for sensing the pressure prevailing in the combustion chamber, which method enables the calibration of the sensor via the steps of: sensing the pressure in the combustion chamber using the sensor, measuring the amount of air being inducted into the combustion chamber, determining, using the pressure sensed by the pressure sensor, a factor which is proportional to the amount of air inducted into the combustion chamber, comparing the determined factor with a standard factor to determine the difference therebetween, and calibrating the output of the sensor using the difference.

BRIEF DESCRIPTION OF THE DRAWINGS

The features and advantages of the arrangement of the present invention will become more clearly appreciated from the following description taken in conjunction with the accompanying drawings in which:

FIG. 4 is a flow chart showing the steps which characterize the separation of the motoring pressure and the combustion pressure generation characteristics;

FIG. 7 is a graph showing the correlation between pressure in the combustion chamber and the amount of air inducted into the chamber;

FIG. 8 is a flow chart showing the characterizing steps of a program via which calibration of a combustion pressure sensing pressure sensor may be executed;

FIG. 10 is a table showing the effects of operational parameters such as EGR, air-fuel ratio and ignition timing on five combustion process parameters;

DETAILED DESCRIPTION OF THE PREFERRED EMBODIMENTS

Figure 1:
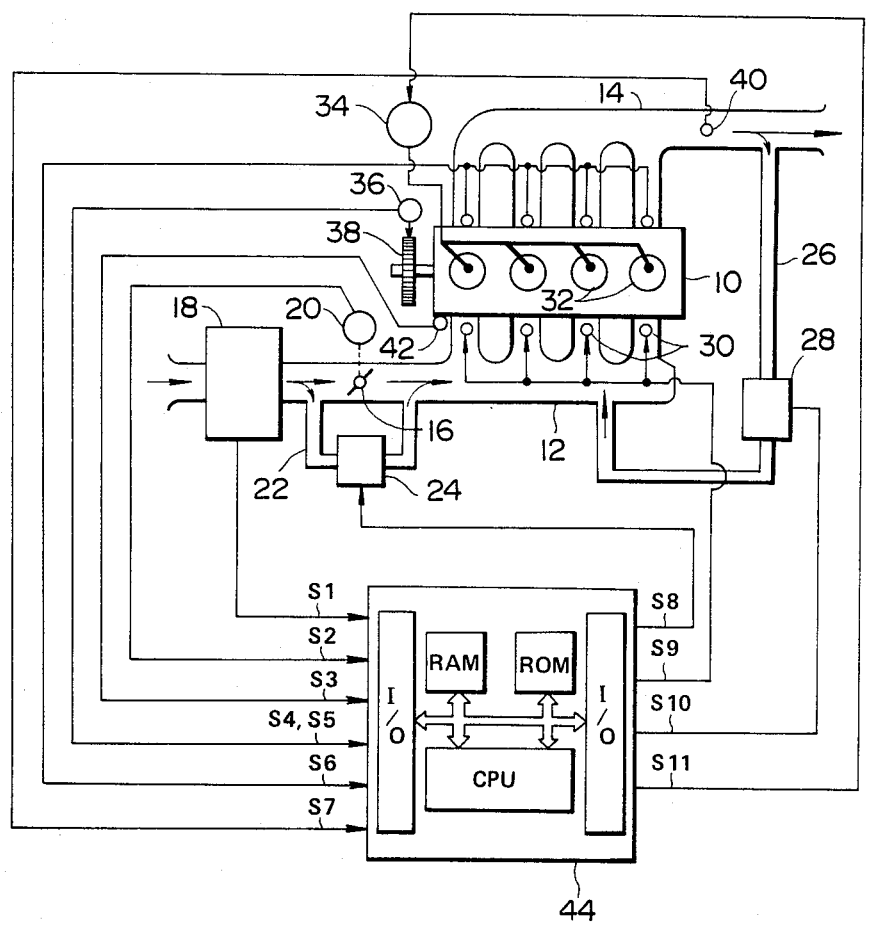
FIG. 1 is a schematic diagram of an engine system in which embodiments of the invention can be executed.

FIG. 1 shows an internal combustion engine system in which the present invention can be implemented. This engine system, as shown, includes a four cylinder four cycle (by way of example only) internal combustion engine 10, an induction manifold 12, an exhaust manifold 14, a throttle valve 16 disposed in the induction manifold downstream of an air flow meter 18, a throttle position sensor 20 operatively connected with the throttle valve, a by-pass passage 22 leading around the throttle valve 16 and air flow control valve 24 disposed in the passage 22 for controlling the flow of air therethrough. The system further includes an exhaust gas recirculation conduit 26, a EGR control valve 28 disposed in the conduit 26 for controlling the amount of exhaust gas recirculated from the exhaust manifold 14 to be re-introduced into the combustion chambers (no numeral), a series of fuel injectors 30, a series of spark plugs 32 operatively connected to an ignition device 34, a crankangle sensor 36 disposed adjacent a fly wheel (or the like) 38, an exhaust gas sensor 40 disposed in the exhaust conduit 14 for sensing the oxygen concentration (or the like) therein, an engine coolant temperature sensor 42, and a series of pressure sensors 44 each associated with one of the combustion chambers for sensing the pressure prevailing therein.

A central control unit 46 includes a microprocessor (including a RAM, ROM, CPU and input and output interfaces I/O) and receives input signals S1 to S7 from the air flow meter 18, throttle position sensor 20, the engine coolant temperature sensor 42, the crankangle sensor 36, the pressure sensors 44 and the exhaust gas sensor 40 as shown.

According to the execution of various control programs, the control unit 46 outputs appropriate control signals S8 to S11 to the by-pass passage air flow control valve 24, the fuel injectors 30, the EGR control valve 28 and the ignition device 34.

Figure 2A:
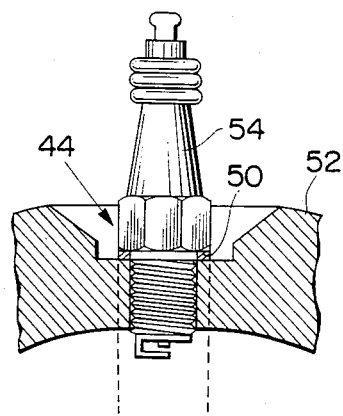
FIGS. 2A and 2B are sectional and plan views respectively, showing a pressure sensor used for sensing the pressure prevailing in combustion chambers of the engine shown in FIG. 1.
Figure 2B:
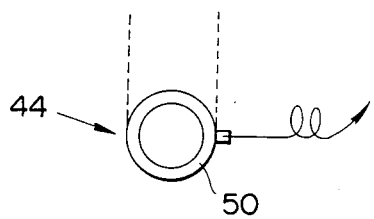

An example of pressure sensor 44 which may be used in conjunction with the present invention is shown in FIG. 2. This sensor takes the form of a piezoelectric element 50 operatively disposed between the cylinder head 52 and a spark plug 54. This element, or strain gauge, reacts to the change in pressure in the combustion chamber and outputs a signal indicative thereof.

Figure 3A:
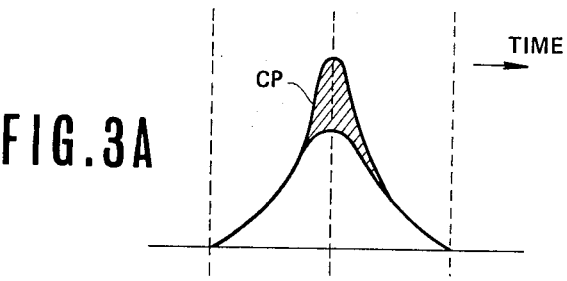
FIGS. 3A to 3D are graphs showing the motoring pressure wave, the associated total pressure generation characteristics and the change which occurs therebetween with change of ignition timing.
Figure 3B:
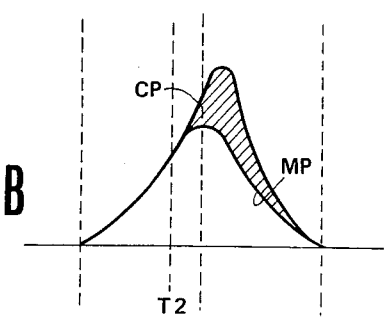
Figure 3C:
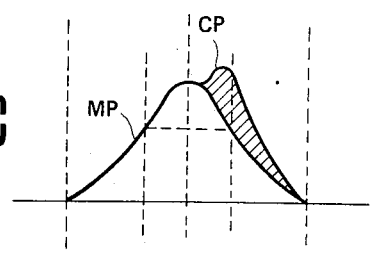
Figure 3D:
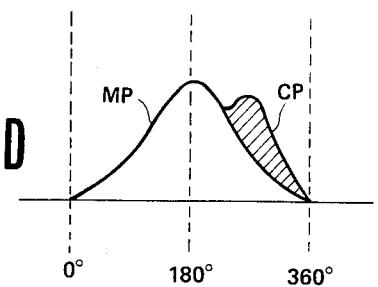

FIGS. 3A to 3D show the technique via which the motor pressure characteristics can be distinguished from the total pressure generation characteristics even in the presence of combustion within the combustion chamber. As seen in FIG. 3A, with a given spark timing the combustion pressure (CP) and the motoring pressure (MP) cooperate in a manner that a single pressure peak is produced (at a crank angle of 180 degrees). Under these conditions it is of course impossible to determine the exact characteristics of the pressure generated by the combustion per se. Accordingly, if as shown in FIGS. 3B to 3D, the ignition timing is gradually retarded, the combustion pressure is produced in the combustion chamber in a manner that the total pressure generation characteristics take the form of a double peak wave. Upon the peak shifting to the degree shown in FIG. 3C for example, it will be understood that the presure generated in the combustion chamber up until TDC (180 degrees) or the end of the compression stroke of the piston, is exclusively motoring pressure. Accordingly, as the motoring pressure generation characteristics take the form of a generally symmetrical wave, the determination of the first half thereof under these conditions permits the mathematical derivation of the second half and thus the determination of the whole wave irrespective of the presence of the combustion pressure peak in the expansion stroke (viz., movement of the piston from TDC toward BDC).

Using the above discussed "peak shifting" technique it is possible, using a microprocessor, to very rapidly determine the motoring pressure characteristics and subsequently the combustion pressure generation characteristics occuring within a combustion chamber and effect steps to optimize the combustion process far more rapidly and accurately than heretofore possible. This will become clear hereinlater.

FIG. 4 shows the characterizing steps of a first "peak-shifting separation" technique effected using a microprocessor. As shown, subsequent to the start of the program at step 101, the ignition timing T is set to a value T2 whereat the pressure peak produced by combustion should occur in a manner such as shown in FIG.

3A wherein the pressure generation charcteristics assume a single peak wave form. At step 102 the ignition timing T is, pending the completion of one full combustion cycle, incrementally retarded to a value of $T+\alpha$ ready for a subsequent series of data recordings.

It will be noted a this point that for the sake of explanation the inventive technique will be assumed to be applied to a four cycle internal combustion engine wherein a full combustion cycle consists of a compression stroke (0-180 degrees), an expansion stroke (180-360 degrees), an exhaust stroke (360-540 degrees) and an induction stroke (540-720 degrees). Of course application of the present invention to a two cycle engine for example would be an easy matter and thus a discussion in connection with same will be omitted for brevity.

At step 104 the pressure in the combustion chamber is read at each of a plurality of predetermined crank angles and an average value for each angle recorded. The averaging of course is carried out to allow for the inevitable momentary fluctuations in the output signal of the pressure sensor.

At step 105 an enquiry as to whether the instantanous average pressure value is greater than or equal to the previously recorded value is made. In the event that the answer to this enquirey is YES, it is assumed that the instantanous reading corresponds to a point on a curve having a positive gradient and the program recycles to step 103. In the event that the answer is NO, it is assumed that the gradient of the pressure characteristics curve is now negative and the program then proceeds to step 106 whereat a further enquiry is carried out to ascertain if the average pressure values continue to decrease or not. In the event that the pressure valves do not continue to decrease, it assumed that a second peak is being approached and the program recycles to step 103. In the event that it is discerned that the average pressure values do continue to decrease it is assumed that at least the first of two expected peaks has been traversed and the program proceeds to step 107.

In step 107 an enquiry is made as whether the average pressure values are increasing. If the answer to this question is NO, then it is assumed that the second of the two expected peaks has not yet been traversed and the program recycles to step 103. In the event that the average pressure values are sensed to be in fact increasing it is assumed that the motoring pressure peak has been traversed and a second peak due to the delayed combustion is being approached. To ascertain this fact the enquiry is made at step 108 as to whether the compression stoke has finished (viz., is the crankangle equal to or greater than 180 degrees). If the answer to this enquiry is NO, then it is assumed that an abnormal combustion process, such as due to pre-ignition, is occuring and the program, at step 109, enquires as to the number of engine cycles thus far completed. In the event that a predetermined number of engine cycles has in fact occured an abnormal condition warning is generated. If the answer is NO the program returns to step 103.

However, in the event that the answer at step 108 is YES, then all the data necessary is deemed recorded and the program proceeds to step 111 wherein the data for the second half of the motoring pressure curve is extrapolated. Subsequently, in step 112, the program then derives the combustion pressure generation characteristics by subtracting the motoring pressure data from the average pressure data. The program terminates as step 113.

Figure 5B:
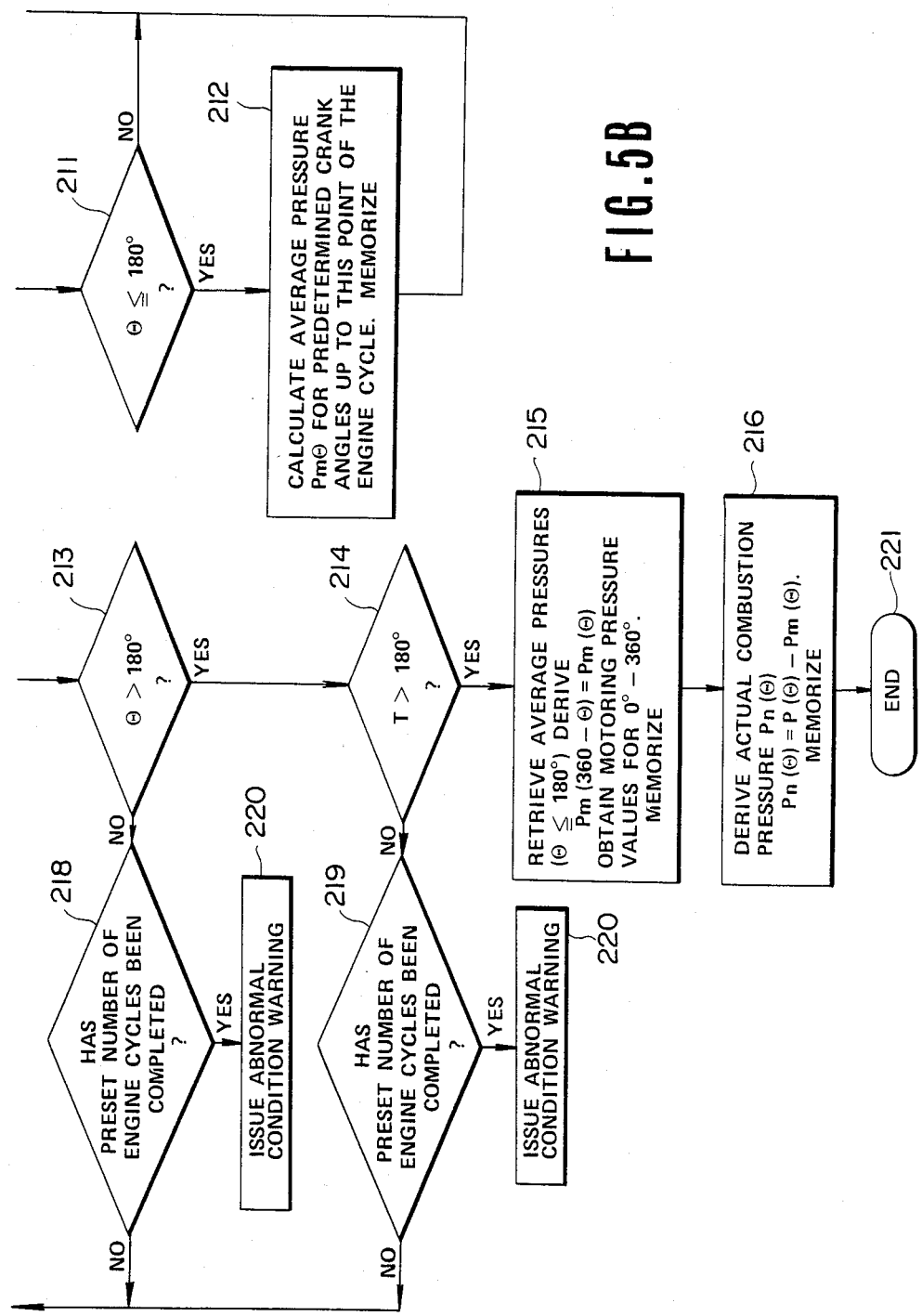
FIG. 5 is a flow chart showing the steps which characterize a second method via which the separation of the motoring and combustion pressures may be achieved.

FIG. 5 shows a second second program for deriving the combustion pressure generation characteristics. In this program, subsequent to the start at step 201, the ignition timing is set to T2 in a manner to induce single peak pressure characteristics within the combustion chamber. In step 203 a flag is set to zero and in step 204, the pressure in the combustion chamber read at each of a plurality of predetermined crank angles and memorized. It should be noted that the output of the pressure sensor should be smoothed or subject to a like process prior to reading so as to eliminate the inevitable noise-like nature thereof. In step 205, an enquiry is made as to whether the instantanous pressure is equal to or greater than the previously recorded pressure. In the event that the intantaneous pressure is not equal to or greater than the previous pressure, the flag is set to "1" in step 206.

In step 207, an enquiry is made as to whether the flag changed from "1" to "0" or not. If there was no change the program goes to step 208 wherein the instantaneous crank angle value is compared with a given value. In this case the given value takes the form of the instantaneous ignition timing T minus an increment "$\alpha$". In the event that the comparison shows that the instantaneous crank angle is not equal to or greater than the given value the program proceeds to step 209 wherein it is determined if one full combustion cycle has been completed or not. In the event that one cycle has been completed then the program goes to step 210 wherein the ignition timing is incrementally retarded by a predetermined amount (viz., "$\alpha$") and returns to step 203. If one full engine cycle has, as yet, not been completed, the program recycles to step 204.

In the event that result of the comparison carries out in step 208 is shows that the crank angle is less than the given value, the program proceeds to step 211 wherein it is determined if the instantanous crank angle is equal to or greater than 180 degrees (viz., it is determined if the compression stroke is completed or not). If the compression stroke has as yet not been completed, the program recycles to step 204, while in the event that said cycle has been completed the program proceeds to, in step 212, calculate average pressure values for each of the predetermined crank angles up until this stage and then recycles to step 204.

In the event that the flag is detected as having changed from 1 to 0 is step 207, the program goes to step 213 wherein the enquiry is made as to whether the instantanous crankangle is greater than 180 degrees. In the event that the answer to this enquiry is YES the program, at step 214, determines if the ignition timing (T) is greater than 180 degrees. If in fact the ignition timing is greater than 180 degrees it is assumed that sufficient data has been stored and the program proceeds to, in step 215, use the average values derived and stored in step 212 to mathematically drive the second half of the motoring pressure wave data. In step 215, the program subtracts the motoring pressure data from the averaged values to determine the combustion pressure data.

However, if the results of the enquiries carried in either of the steps 213 and 214 is negative (viz., NO) the program determines (steps 217 and 219) if a predetermined number of engine cycles have been completed and issues an abnormal condition warning (steps 218, 220) in the event that said number have been completed or recycles to step 204 in the event that the predetermined number of cycles is not yet reached.

Figure 6A:
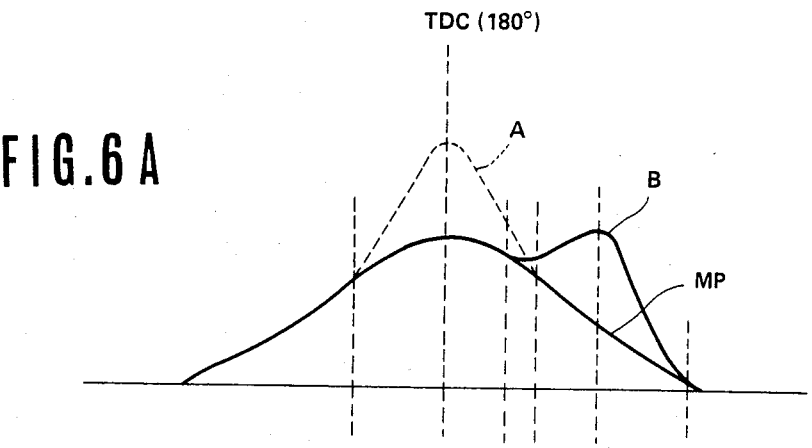
FIGS. 6A to 6C are wave forms showing the determination of the motoring pressure characteristics, the derivation of the actual combustion pressure generation characteristics and the derivation of other data vital for comprehending and/or controlling the combustion process.
Figure 6B:
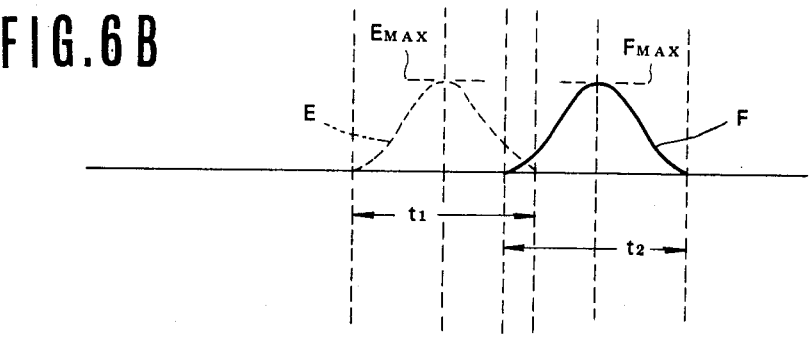
Figure 6C:
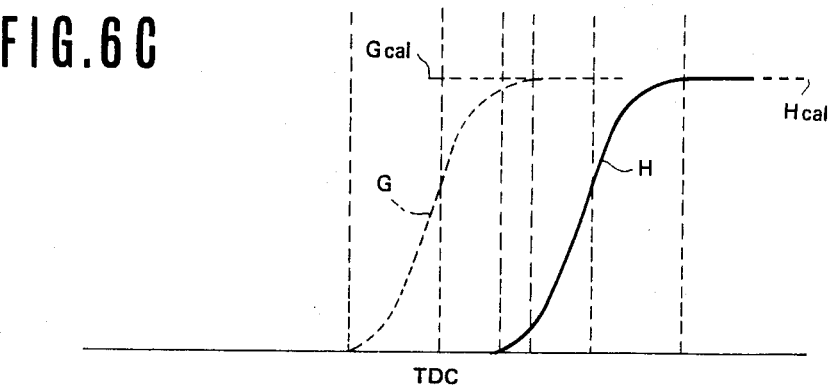

FIGS. 6A to 6C show in graphical form, details of how the data derived using the previously disclosed programs can be used to derive further data vital for comprehending the actual nature of the combustion process.

FIG. 6A shows (in broken line) a "total" pressure curve A similar to that shown in FIG. 3A, a second superimposed "total" pressure curve B of the nature shown in FIG. 3C and a motoring pressure curve MP. Using the technique discussed hereinbefore, it is possible to obtain the respective pressure generation curves E and F. From these curves the respective combustion times $t_1$ and $t_2$ along with the respective maximum combustion pressure values $E_{max}$ and $F_{max}$ can be obtained. By integrating the curves shown in FIG. 6B, the curves G and H shown in FIG. 6C may be obtained. These curves reveal the amount of heat $G_{cal}$ and $H_{cal}$ produced in the respective combustions.

As will be appreciated, with all of the above data readily available within a very short period of time, accurate analysis of the combustion process can be fully realized.

FIG. 7 is a graph showing the correlation between the pressure in the combustion chamber and and induction air amount. In this graph, trace L1 denotes the pressure change within the combustion chamber (viz., total) while trace L2 denotes the motoring pressure which occurs under the same conditions. Of course in this two dimensional representation it will be understood that variables such as ignition timing, air-fuel ratio, EGR engine speed and the like are fixed.

As will be readily appreciated, the motoring pressure and the total pressure are both directly proportional to the amount of air inducted into the combustion chamber. Therefore, if laboratory experiments are conducted, it is possible to determine, for any given set of conditions (e.g. load, engine speed air-fuel ratio etc.), both the motoring pressure as well as the total pressure which will be produced. This data can be used during running of the vehicle under the same set of conditions to calibrate the output of the sensor. That is to say, it become possible to continously allow for the physical changes in the sensor and the attendant changes in output which occur with changes in temperature and with the passing of time. For example, the output changes which occur within a temperature range of −40 to 100 degrees C.

The motoring pressure for this purpose is the most advantageous as it is not influenced by parameters such as EGR, air-fuel ratio etc., and can be experimentally determined and logged against induction air volume with accuracy. Accordingly, by being able to determine the motoring pressure as described hereinbefore, frequent recalibration of the sensor output can be readily carried out and thus permit compensation for the change in output characteristics of the device which occur with the passing of time and change in temperature.

Thus, during a cold engine start in winter (for example) when the temperature of the sensor is apt to to below zero, it is possible to sense the amount of air being inducted into the engine, derive the volume of same at STP (standard temperature and pressure) and hence look up the motoring pressure which will occur under such conditions. Subsequently, by deriving the motoring pressure characteristics using the aforediscussed "peak shifting" technique, the actual output of the sensor may be modified or otherwise assigned a coefficient which will bring the indicated pressure into agreement with pressure actually prevailing in the combustion chamber.

FIG. 8 shows a flow chart wherein the characterizing steps of the above discussed calibration process are carried out using a microprocessor. As shown, in this program subsequent to the START of the program at step 301, the combustion chamber pressure is read at a preselected crank angle and memorized. Of course this step may include smoothing or the averaging of several closely read values so as to eliminate the momentary noise-like fluctuations in the pressure sensor output. At step 303, the air induction amount is read. This may be done by reading the output of an air flow sensor, such as #18 shown in FIG. 1.

In step 304 the temperature of the air being inducted is read and the volume of air corrected to STP. In step 305 the program obtains, by table look-up or the like technique, the predetermined value of the pressure (motoring pressure) which occurs at the particular crank angle for the determined induction air amount. Subsequently, in step 306 it is determined whether the sensor is correctly indicating the actual motoring pressure in the combustion chamber. If the sensor is indicating a pressure larger than the actual pressure the program proceeds to in step 307 to decrease the value of the signal until equal with the prememorized value. In the event that the output of the pressure sensor indicates that the pressure in the combustion chamber is lower than the actual pressure, the value of the sensor output is increased appropriately. If there is no difference, the program proceeds directly to step 309 wherein it terminates.

It will be appreciated that by being able to accurately determine the motoring pressure characteristics and subsequently being able to accurately calibrate the output of the pressure sensor or sensors (it being kept in mind that calibration can be effected individually for each of the sensors associated with the multiple cylinder engine shown in FIG. 1) that very accurate control of various control parameters such as EGR amount, ignition timing and air-fuel ratio may be realized.

FIGS. 9A to 9F show the effect of EGR, air-fuel ratio and ignition timing on the combustion process. As will be appreciated from FIGS. 9A and 9B upon increasing the amount of exhaust gas recirculated back into the combustion chamber, the pressure generation characteristics within the combustion chamber change from the solid line curve H1 to the broken line curve H2 with an attendant decrease in maximum pressure within the combustion chamber. However, the actual nature of the change does not become clear until the motoring pressure is subtracted using the pressure characteristic separation technique discussed hereinbefore. As shown in FIG. 9B, not only does the maximum combustion pressure decrease from HP11 to HP12, but the crank angle at which the pressure occurs moves from TDC (180 degrees) to a value indicated by T10 along with a notable decrease in the rate at which the pressure increases and decreases.

The effect of changing the air fuel ratio is highlighted in FIGS. 9C and 9D. In this instance, any deviation either to the rich or lean side of the stoichiometric air-fuel ratio (A/F=14.8:1) leads to a decreased maxium pressure generated within the combustion chamber. For example a drop from JL1 to JL2 (depicted by the solid line and broken line curves J1 and J2. As clear from FIG. 9D under such circumstances the maximum combustion pressure reduces from JL11 to JL12 but occurs essentially at the same crank angle.

FIGS. 9E and 9F show the effect of retarding the ignition timing. As will be appreciated the crank angle at which the maximum combustion pressure is generated moves to a point indicated by T11 with an attendant notable decrease in maximum combustion chamber pressure. In this case the maximum combustion pressure per se undergo little change and exhibits essentially the same maximum value (KL11).

Figure 9:
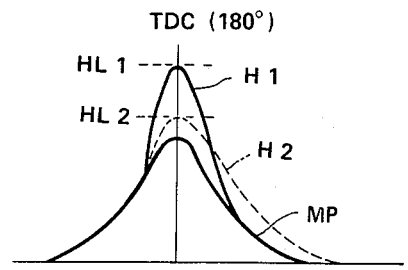
FIGS. 9A to 9F are charts showing the effect of EGR, air-fuel ratio and ignition timing on the combustion process.
Figure 9:
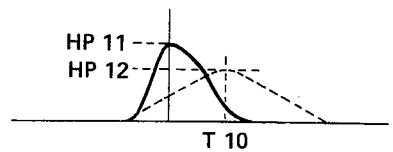
Figure 9:
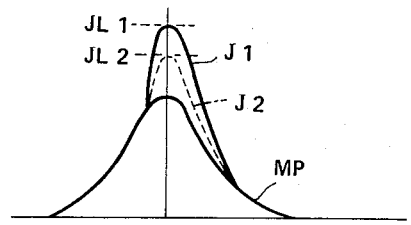
Figure 9:
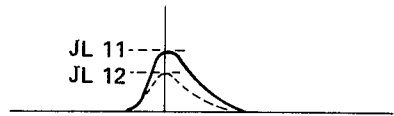
Figure 9:
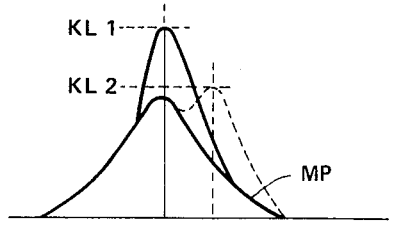
Figure 9:
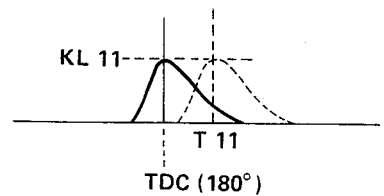
Figure 11:
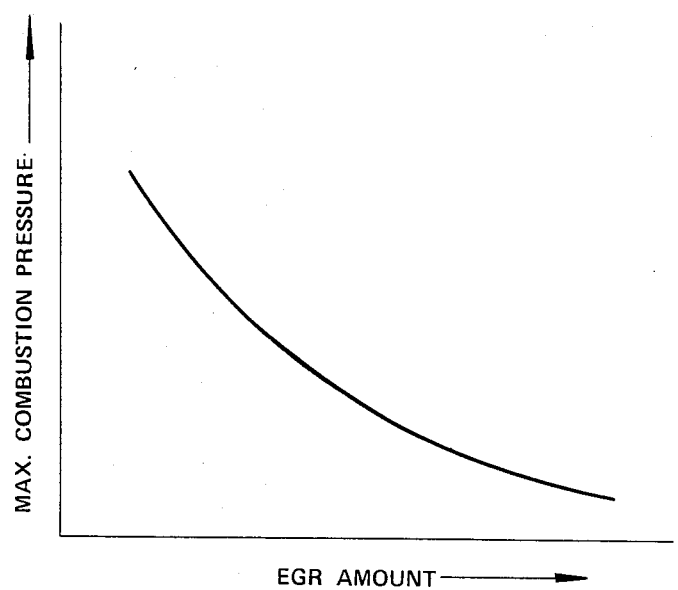
FIG. 11 is a graph showing EGR amount plotted against maximum combustion pressure with other variables held constant.

FIG. 9 shows a table wherein the effect of three control parameters, namely: EGR, air fuel ratio and ignition timing, on five combustion process parameters are listed in terms of "large" and "small" effect. The five combustion process parameters are: A—maximum combustion pressure; B—crank angle at which the maximum combustion pressure is generated; C—the gradients of the combustion pressure curves (via., the rate at which the combustion pressure develops and decreases); D—the amount of heat produced by the combustion; and E—the combustion time.

By way of example, it will be noted that EGR, air-fuel ratio and ignition timing all have a "large" effect on the maximum combustion pressure.

As will be appreciated, using FIG. 10 by way of example, possible to establish a series of schedules wherein the effect of each of EGR, air-fuel ratio and ignition timing can be plotted individually against each of the five combustion process parameters in the form of two dimensional tables for any given set of fixed operating conditions (e.g. engine speed load etc.).

It will therefore clear that:

(1) When the EGR amount is varied the maximum value of the combustion pressure is markedly effected. Using this knowledge it is possible, if the actual combustion pressure is known to accurately predict the amount of exhaust gas to be recirculated, the amount of NOx which will be formed, the torque which will be developed and the fuel consumption rate.

(2) The crank angle at which the combustion pressure maximizes retards with increase in EGR. If the crank angle at which the pressure in the combustion pressure maximizes is known, the above mentioned parameters, viz., EGR amount, NOx formation, torque output and fuel consumption rate may be determined.

(3) The amount of EGR, the NOx formation, torque output and fuel consumption rate are effected by the rate at which the pressure rises and falls within the combustion chamber, the time for which combustion continues and the amount of heat produced. Accordingly, if one or more of the above combustion process parameters are used in combination, a remarkably accurate prediction as to the amounts of EGR, the air-fuel ratio and ignition timing which may be used to produce optimal engine performance can be made.

(4) The maximum value of the combustion pressure, the rate at which the pressure increases and decreases and the amount of heat produced are notably affected by changing the air-fuel ratio. However, it should be noted that within the usually used air-fuel ratio range a marked influence on the crank angle at which the maximum pressure occurs is absent. Accordingly, changes in the air-fuel ratio the amount of NOx being formed and the torque being produced by the engine can be predicted given the maximum combustion pressure, the rate at which the pressure rises and falls, the time for which combustion continues and the amount of heat produced by the combustion.

(5) The combustion pressure (maximum) and the crank angle at which the combustion time maximizes, vary notably with ignition timing. Equipped with this data, the amount of NOx being formed, the torque being produced by the engine and the fuel consumption rate can be determined.

Figure 12A:
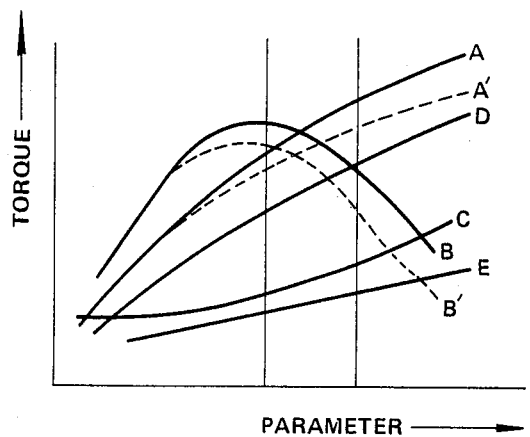
FIGS. 12A to 12C show shedules wherein, torque output, NOx formation and heat generation (ordinate) are plotted against each of five combustion process parameters.
Figure 12B:
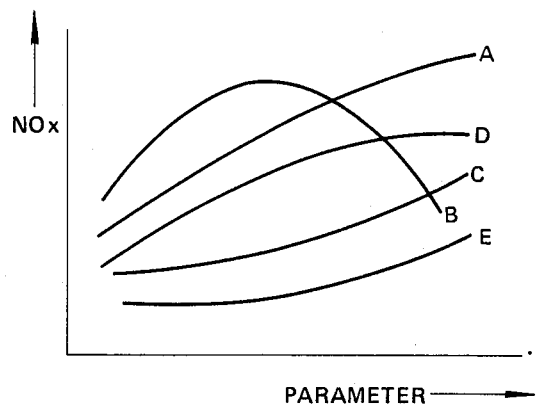
Figure 12C:
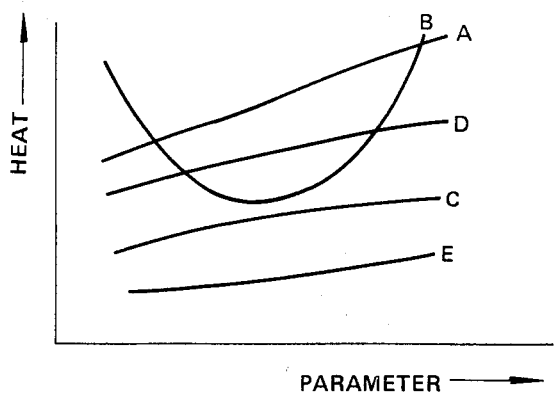

FIGS. 12A to 12C show each of the combustion process parameters A to E of FIG. 10 plotted against the operational parameters: torque, NOx formation and heat generation, respectively.

Figure 13A:
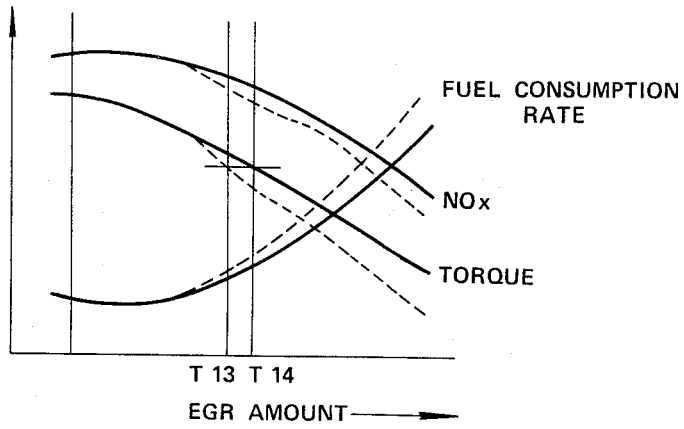
FIGS. 13A to 13C show schedules wherein fuel consumption rate, NOx formation, and torque output are plotted against ERG amount, air-fuel ratio and ignition timing (abscissa)
Figure 13B:
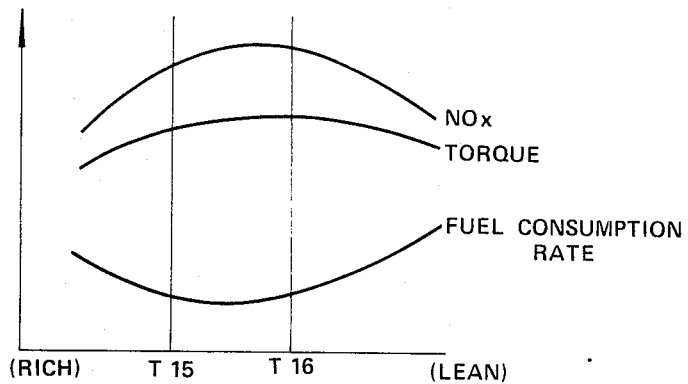
Figure 13C:
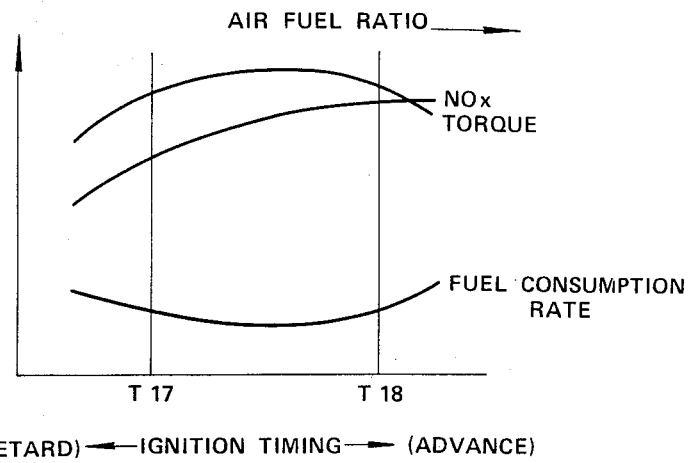

FIGS. 13A to 13C show NOx formation, torque and fuel consumption rate plotted against ERG amount, air-fuel ratio and ignition timing, respectively. As will be appreciated, each of these graphs is for a given set of conditions wherein only the given variable (viz., EGR, A/F and Ignition timing) is changed.

In previously proposed engine control systems various control schedules are determined and set into a permanent memory such as a ROM. However, with the passage of time engine systems are subject to change and/or deterioration whereby the initially determined or "blue print" performance characteristics such as required NOx formation levels, torque output and like can no longer be met by using the fixed EGR, air-fuel ratio and ignition timing schedules.

However, with the advent of the ability to accurately comprehend the combustion process and to accurately calibrate the pressure sensors, control of "operational" parameters such as EGR, air-fuel ratio etc., and/or the revision of the schedules according to which EGR, air-fuel ratio and the like are controlled in order to achieve the predetermined performance schedules becomes a practical reality. For example, should the torque output characteristics be determined using the combustion process parameter data to have deteriorated as shown in broken line in FIG. 13A, it is possible to appropriately reduce the EGR until the required torque output has again been reached.

Using this technique it is possible to update target values in a manner that the originally required levels of engine performance can be met. Viz., if the same parameter is detected as having changed and remained in a new state for a given period, a new set of operating conditions may be deemed to have come into existence and and a new target value warrented.

Figure 14:
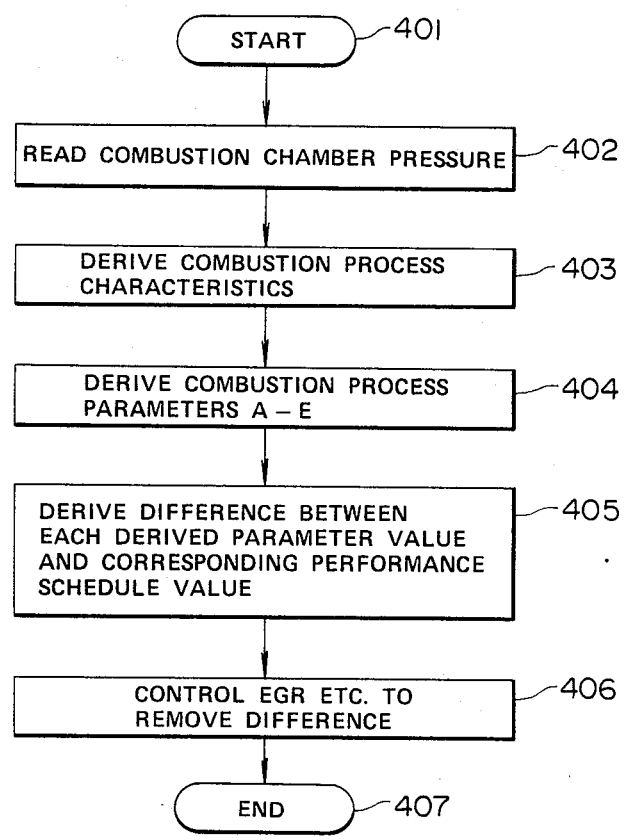
FIG. 14 shows a flow chart illustrating the characterizing steps of a program used for obviating the deviation from desired engine performance characteristics which occur with time and wear.

FIG. 14 shows in flow chart form the steps which may be executed using a microprocessor in order to achieve the desired performance characteristics. As shown, in step 402 the combustion chamber pressure data is read and used in a manner as set forth hereinbefore to determine the combustion pressure generation characteristics in step 403. In step 404, the five previously mentioned combustion process parameters A–E are determined and compared with fixed schedules in a manner to determine the difference therebetween. In step 405 the difference derived in step 404 is used to instigate steps such as increasing or decreasing the amount of exhaust gas recirculated, the air-fuel ratio etc., in a manner to eliminate said differences.

Figure 15:
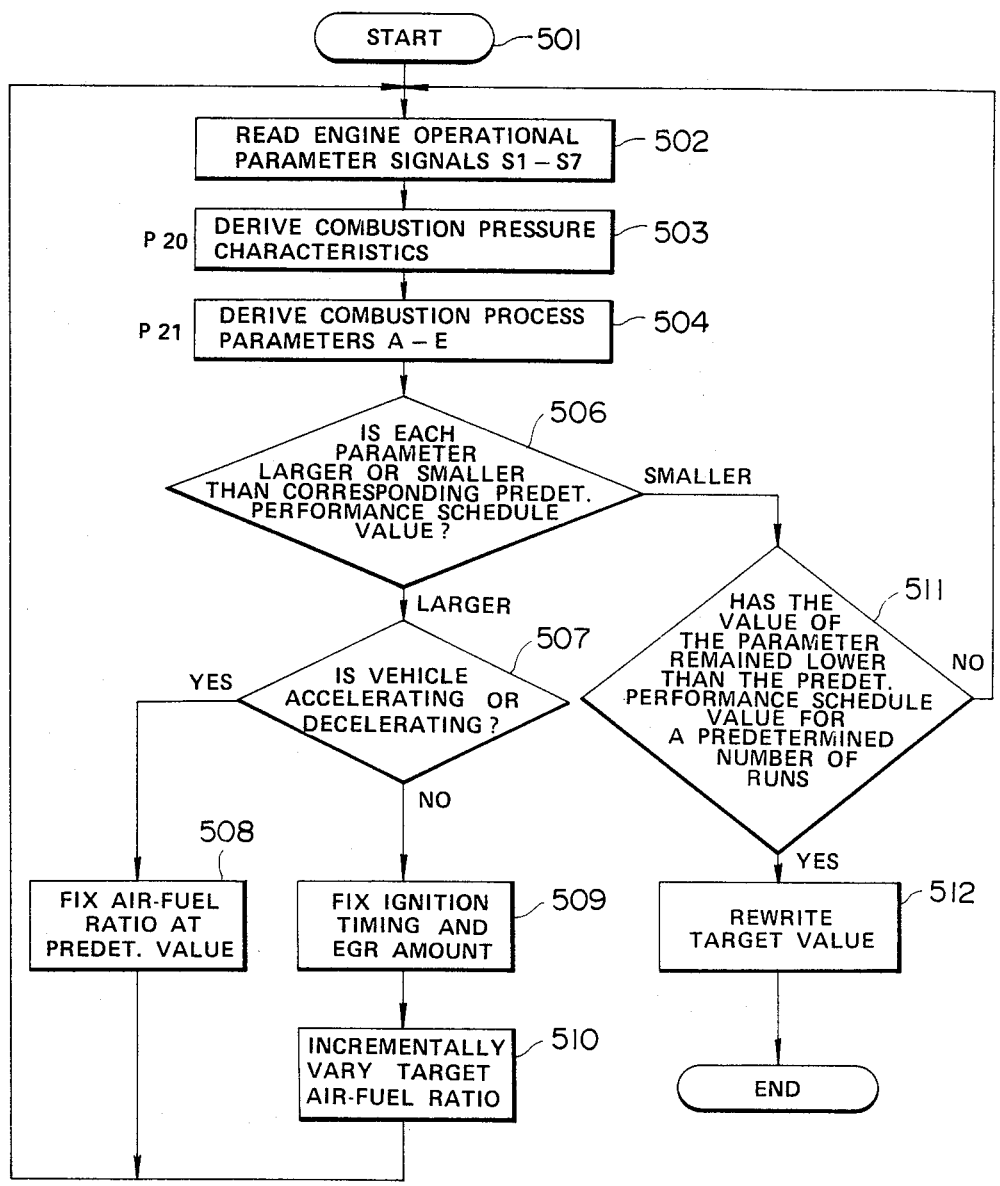
FIG. 15 shows a flow chart illustrating the characterizing steps of a program used for study-controlling, viz., determining and rewriting air-fuel ratio target values which enable engine "blue print" performance requirements to be met irrespective of physical changes and/or deterioration of the engine and/or associated components.

If the differences continue to appear in an essentially constant form, the schedule itself may be modified. FIG. 15 shows a program wherein such a method is applied, in this instance the "study-control" is performed in connection with the air-fuel ratio.

In this program, subsequent to the START, the engine operational parameter signals S1–S7 (see FIG. 1)

are read in step 502. In step 503, the combustion pressure generation characteristics are derived in the previously described manner. Subsequently, in step 504, the combustion process parameters A–E are determined and compared with predetermined performance schedules in step 506. In the event that the derived value is larger than the corresponding performance schedule value, the program proceeds to step 509 wherein it is determined if the vehicle is accelerating or decelerating. In the event that the vehicle is accelerating or decelerating, the program goes to step 508 wherein the air-fuel ratio is fixed to a given value. This prevents inappropriate values (viz., abnormally rich values) from being taken into consideration. If the vehicle is neither accelerating or decelerating, the program proceeds to step 509 wherein the ignition timing and ERG amount are fixed for the purposes of adjusting the air-fuel ratio, and then proceeds to step 510 wherein the target value is incrementally increased. The program then recycles to step 502.

If the derived combustion process parameter value is determined in step 506 to be lower than the performance schedule value, then the program goes to step 511 wherein it is determined if the value of the instant derived parameter has been lower than the standard value for a predetermined time or number of program runs. If the answer to this enquiry is NO then the program recycles to step 502. In the event that the answer is YES, the the target value is rewritten in step 512 and the program terminates.

It will be understood that the same program may be applied to each of the other "control" parameters (viz., EGR and ignition timing).

In summary, by determining, via use of the so called "peak shifting" technique, the instantaneous combustion process parameters (A–E) it is possible to accurately ascertain the instantaneous performance parameters (viz., torque output, NOx formation and fuel consumption ratio). These can be subsequently compared with predetermined shedules and in the event that any difference exits therebetween, operational parameters (viz., exhaust gas recirculation (EGR) amount, air-fuel ratio and ignition timing) can be varied in a manner to restore the engine performance to the desired levels and thus meet the requirements of the "blue print" schedules. In the event that a difference continues to occur, the "blue print" schedules and/or associated target values are rewritten to take the changes (deterioration etc.) of the engine into account.

What is claimed is:

1. In an internal combustion engine having a piston operatively connected with a crankshaft and movably disposed in a cylinder to define a combustion chamber and a sensor for sensing the pressure prevailing in said combustion chamber, a method of calibrating said sensor comprising the steps of:
    sensing the pressure in said combustion chamber using said sensor;
    measuring the amount of air being inducted into said combustion chamber;
    determining, using the pressure sensed by said pressure sensor, a factor which is proportional to the amount of air inducted into said combustion chamber;
    comparing said determined factor with a standard factor to determine the difference therebetween; and
    calibrating the output of said sensor using said difference.

2. A method as claimed in claim 1, wherein said step of determining said factor takes the form of:
    deriving the motoring pressure characteristics which occur within said combustion chamber; and
    selecting a motoring pressure which occurs at a predetermined crank angle; and
    wherein said step of comparing includes:
    comparing said selected motoring pressure with a predetermined motoring pressure value which occurs at said crank angle for the same amount of inducted air.

3. A method as claimed in claim 2, wherein said step of calibrating includes the step of:
    changing the pressure value indicated by said sensor in accordance with the difference between said selected motoring pressure and said predetermined motoring pressure value.

4. A method as claimed in claim 2, wherein said step of deriving includes:
    arranging the ignition timing so that pressure due to combustion does not occur during the compression stroke;
    recording the change in pressure in the combustion chamber which occurs with movement of said piston during said compression stroke; and
    using the recorded data to derive the motoring pressure characteristics which occur during the expansion stroke and thus obtain the motoring pressure characteristics for said compression and expansion strokes irrespective of the presence of combustion pressure being produced during said expansion stroke.

5. In an internal combustion engine having a piston operatively connected with a crankshaft and movably disposed in a cylinder to define a combustion chamber and a sensor for sensing the pressure prevailing in said combustion chamber, an arrangement for calibrating said sensor comprising:
    means for measuring the amount of air being inducted into said combustion chamber;
    means for determining, using the pressure sensed by said pressure sensor, a factor which is proportional to the amount of air inducted into said combustion chamber;
    means for comparing said determined factor with a standard factor to determine the difference therebetween; and
    means for calibrating the output of said sensor using said difference.

6. An arrangement as claimed in claim 5, wherein said determining means takes the form of:
    means for deriving the motoring pressure characteristics which occur within said combustion chamber; and
    means for selecting a motoring pressure which occurs at a predetermined crank angle; and
    wherein said comparing means includes:
    means for comparing said selected motoring pressure with a predetermined motoring pressure value which occurs at said crank angle for the same amount of inducted air.

7. An arrangement as claimed in claim 6, wherein said calibrating means includes:
    means for changing the pressure value indicated by said sensor in accordance with the difference between said selected motoring pressure and said predetermined motoring pressure value.

8. An arrangement as claimed in claim 6, wherein said deriving means includes:

means for arranging the ignition timing so that pressure due to combustion does not occur during the compression stroke;

means for recording the change in pressure in the combustion chamber which occurs with movement of said piston during said compression stroke; and means for using the recorded data to derive the motoring pressure characteristics which occur during the expansion stroke and thus obtain the motoring pressure characteristics for said compression and expansion strokes irrespective of the presence of combustion pressure being produced during said expansion stroke.

* * * * *